(12) United States Patent
Georgeson et al.

(10) Patent No.: US 8,878,698 B2
(45) Date of Patent: Nov. 4, 2014

(54) LIGHTNING STRIKE DETECTION

(75) Inventors: Gary E. Georgeson, Federal Way, WA (US); Gregory J. Clark, Seattle, WA (US); Michael D. Fogarty, Auburn, WA (US); Jeffrey L. Duce, Milton, WA (US)

(73) Assignee: The Boeing Company, Chicago, IL (US)

( * ) Notice: Subject to any disclaimer, the term of this patent is extended or adjusted under 35 U.S.C. 154(b) by 1653 days.

(21) Appl. No.: 12/052,618

(22) Filed: Mar. 20, 2008

(65) Prior Publication Data
US 2009/0237272 A1 Sep. 24, 2009

(51) Int. Cl.
*G08B 21/00* (2006.01)
*B64D 45/02* (2006.01)

(52) U.S. Cl.
CPC . *B64D 45/02* (2013.01); *Y02T 50/53* (2013.01)
USPC .................................. 340/945; 340/961; 701/3

(58) Field of Classification Search
USPC ............................. 340/945; 701/3, 13, 14, 23
See application file for complete search history.

(56) References Cited

U.S. PATENT DOCUMENTS

| | | | |
|---|---|---|---|
| 4,156,182 A | 5/1979 | Brick et al. | |
| 7,176,812 B1 | 2/2007 | Kelley | |
| 2006/0253942 A1* | 11/2006 | Barrera et al. | 977/852 |
| 2006/0254366 A1* | 11/2006 | Williamson et al. | 73/786 |
| 2007/0159346 A1* | 7/2007 | Wesselink | 340/679 |
| 2008/0142238 A1* | 6/2008 | Rawlings | 174/2 |
| 2008/0159871 A1* | 7/2008 | Bech | 416/229 R |
| 2008/0270052 A1* | 10/2008 | Bernus | 702/65 |
| 2009/0236853 A1* | 9/2009 | Kraemer et al. | 290/44 |

OTHER PUBLICATIONS

Gardiner, Ginger, "Lightning Strike Protection for Composite Structures," http://www.compositesworld.com/hpc/issues/2006/July/1366, (Jul. 2006).

Loughlin et al., "General Aviation Lightning Strike Report and Protection Level Study" DOT/FAA/AR-04/13, Office of Aviation Research, Washington DC (Aug. 2004).

* cited by examiner

*Primary Examiner* — Hai Phan
*Assistant Examiner* — Ojiako Nwugo
(74) *Attorney, Agent, or Firm* — Hugh P. Gortler

(57) ABSTRACT

An aircraft includes a composite structure and a plurality of small lightweight pollable communication devices for providing lightning strike detection coverage of a region of the structure. Each device is rendered inoperative if at least proximate to lightning current.

15 Claims, 5 Drawing Sheets

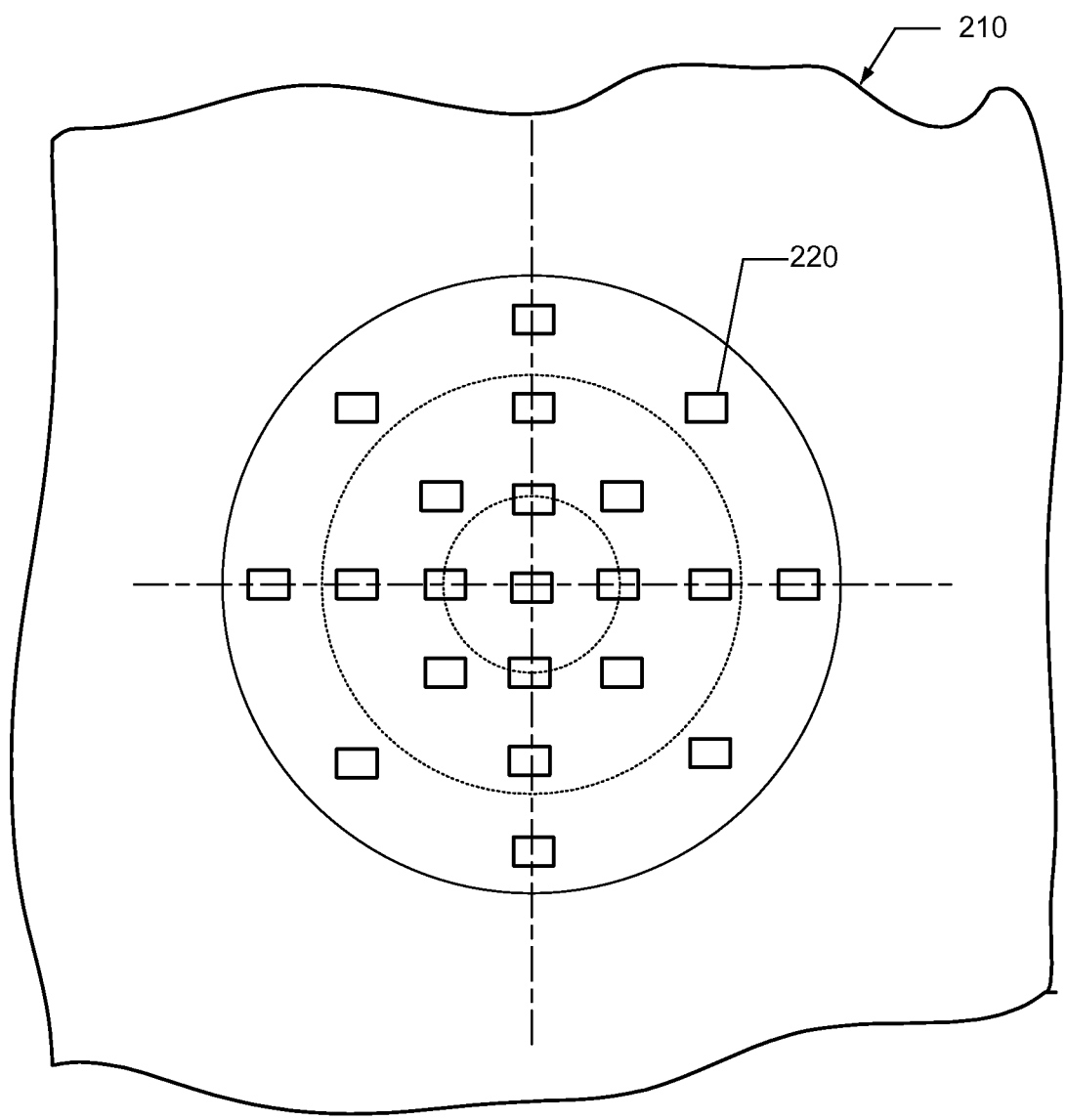

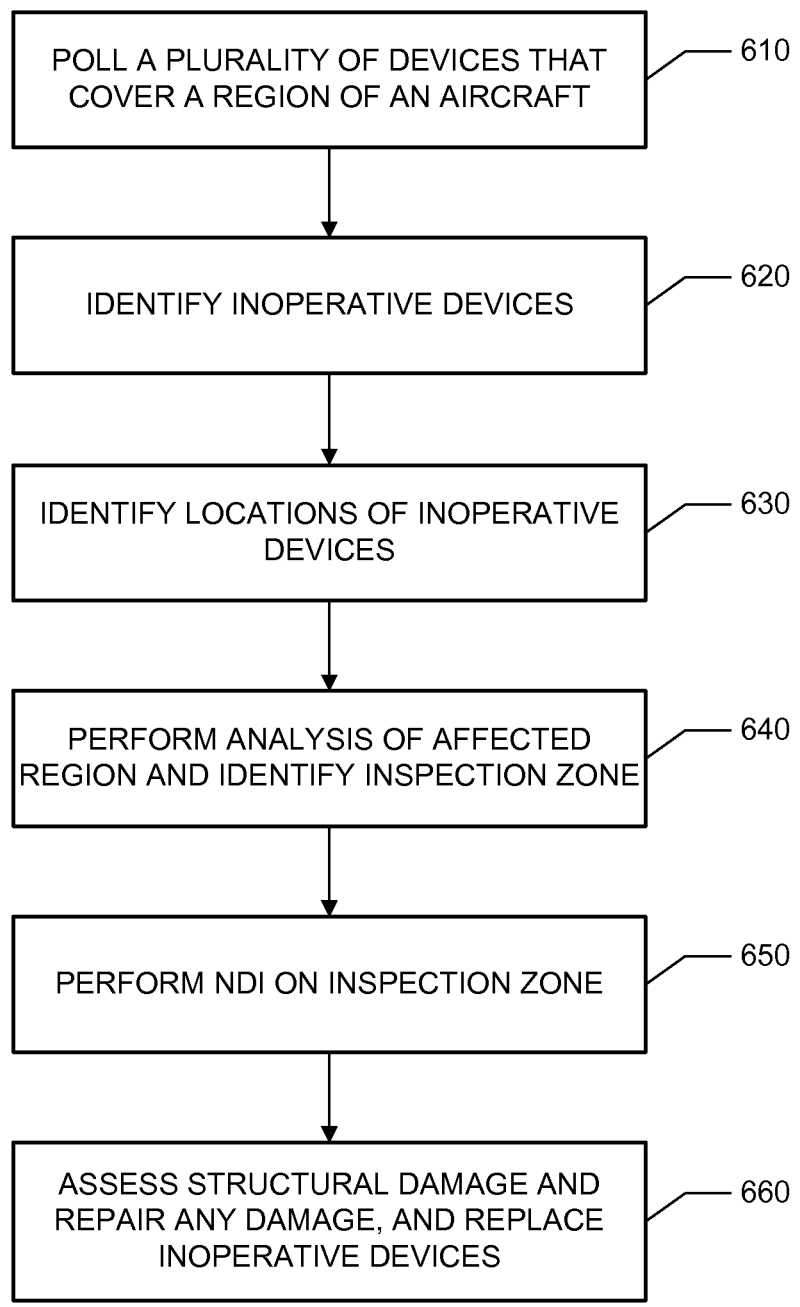

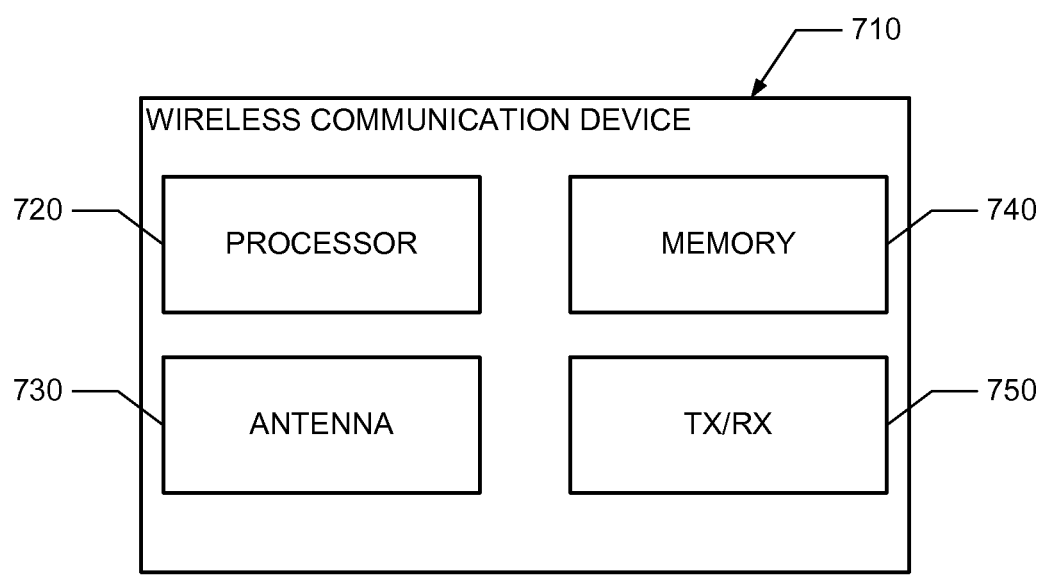

LIGHTNING STRIKE DETECTION

BACKGROUND

General aviation aircraft and large commercial jets are vulnerable to lightning strike. Unlike their metal counterparts, composite structures in these aircraft do not readily conduct away the extreme electrical currents and electromagnetic forces generated by lightning strikes.

Aircraft with composite structures may be equipped with lightning strike protection (LSP). For example, conductive media may be provided on a surface or in a structure to divert and distribute lightning current.

A problem exists with determining whether lightning current has traveled through a particular region of an aircraft. A lightning strike might attach and detach at separate locations, and the lightning current might follow LSP paths or unpredictable paths therebetween. As but one example, lightning might attach at the nose of the fuselage, follow paths toward the aft of the fuselage, and detach at a random location on a horizontal stabilizer. Damage to composite material can occur at the locations of lightning attachment and detachment. Damage to composite material can also occur along paths taken by the lightning current.

The damage caused by a lightning strike might be hidden, or it might not be apparent through visual inspection. To detect damage caused by a lightning strike, very large areas of an aircraft structure might have to be examined. However, non-destructive inspection (NDI) on very large areas is time-consuming and expensive. Moreover, specific areas (e.g., areas containing surface pitting and paint damage) can be missed if a very large area has to be inspected.

SUMMARY

According to an embodiment of the present invention, an aircraft includes a composite structure and a plurality of small lightweight pollable communication devices for providing lightning strike detection coverage of a region of the structure. Each device is rendered inoperative if at least proximate to lightning current.

According to another embodiment, a structure that will be susceptible to electromagnetic effects includes a body, and a plurality of RFID tags mounted to the body for providing EME detection of the structure. Each tag is rendered inoperative if at least proximate to EME current.

According to another embodiment, a method of analyzing structural health of an aircraft includes interrogating a plurality of communication devices that cover a region of the aircraft, identifying those devices that are inoperative, and identifying any inspection zones from the inoperative devices.

BRIEF DESCRIPTION OF THE DRAWINGS

FIGS. 2a and 2b are illustrations of different patterns of communication devices for providing lightning strike detection coverage of an aircraft.

FIG. 6 is an illustration of a method of detecting a lightning strike.

FIG. 7 is an illustration of a wireless communication device.

DETAILED DESCRIPTION

Figure 1:
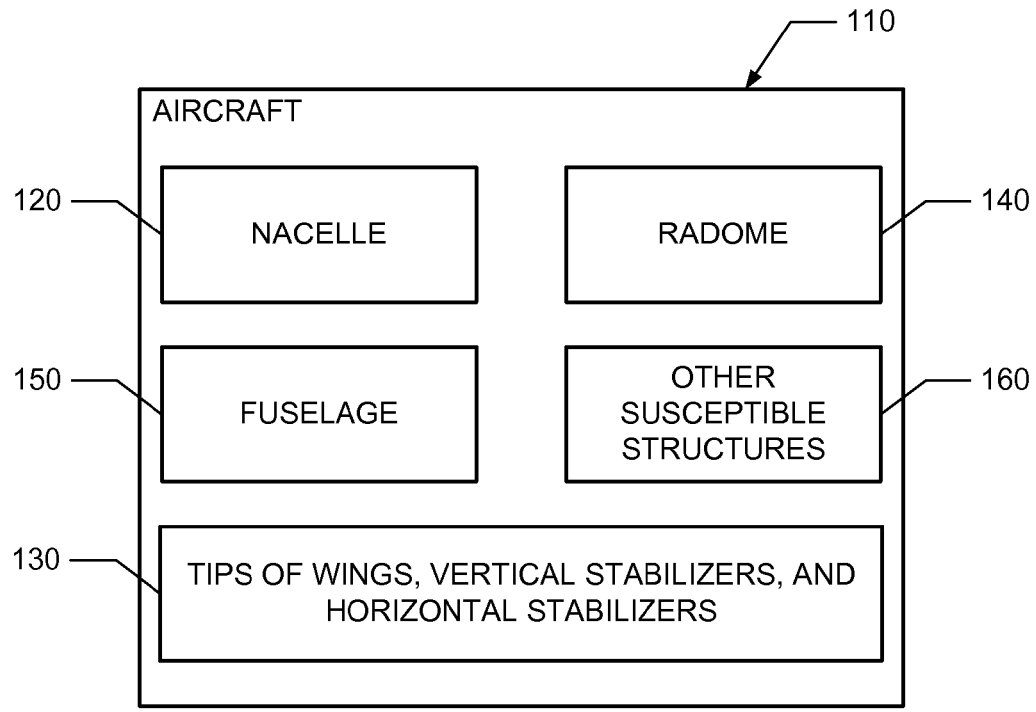
FIG. 1 is an illustration of an aircraft.

Reference is made to FIG. 1, which illustrates an aircraft 110 having a plurality of composite structures. Some composite structures may be made entirely from a composite material such as fiberglass or carbon fiber reinforced plastic (CFRP). Other structures might be a combination of composite materials and metals. For example, a composite structure might include composite material, metal fasteners, electrical bonding jumpers, and metal for lightning strike protection.

Some of the composite structures on the aircraft are more susceptible to lightning strikes than others. On a large commercial aircraft, some of the most susceptible structures include nacelles 120, tips 130 of wings and vertical and horizontal stabilizers, and radomes 140. The aircraft's fuselage 150 and other structures 160 might also be highly susceptible.

A lightning strike might attach and detach at separate locations of the aircraft 110, and the lightning current may travel down an LSP path or follow an unpredictable path that might be hidden or might not be apparent through visual inspection.

Figure 2A:
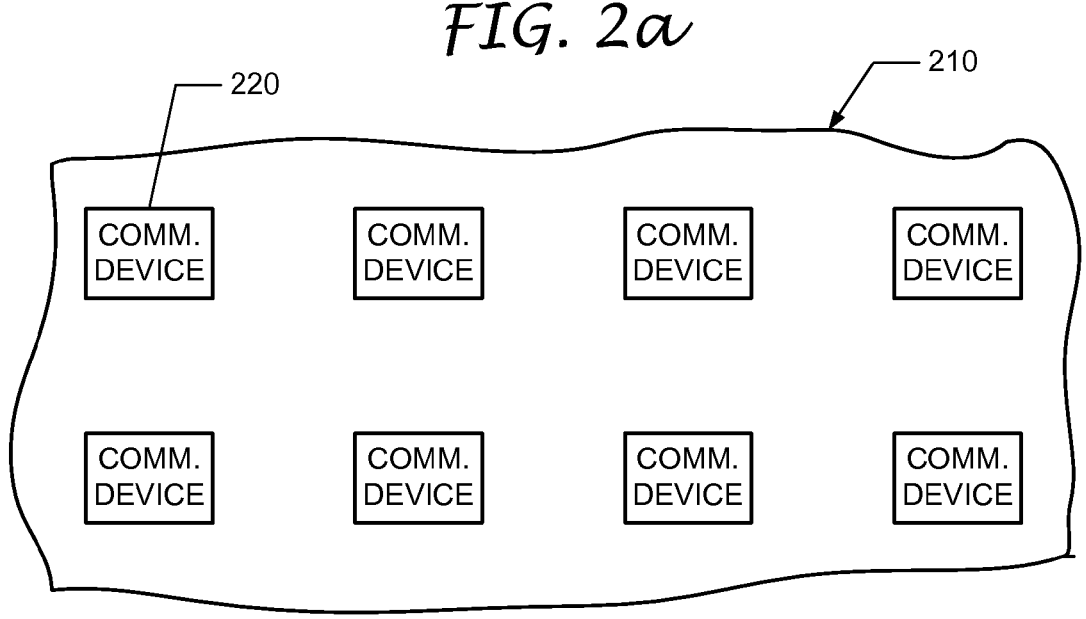

Reference is made to FIG. 2a, which illustrates a plurality of small lightweight pollable communications devices 220 for providing lightning strike detection coverage of a region 210 of a susceptible structure. Each device 220 is rendered inoperative if struck by lightning or proximate to a lightning strike. If during a thunderstorm one of the devices 220 is rendered inoperative, lightning current in the region 210 can be assumed. If a path of devices 220 is rendered inoperative, not only can lightning current in the region 210 be assumed, but a possible path of the current can be identified.

Operability of a device 220 can be determined by polling it. For instance, a device 220 connected to and communicating over a network could be polled by pinging it. An operable device 220 will respond to the ping. A device 220 that is blown or overpowered will not respond.

Devices 220 connected to a wired bus may be polled simply by reading a "status discrete value" (e.g., operative/inoperative) from the device. As the discrete value would always be available to a polling process, there would be no need to wait for a response from such a polled device 220.

The devices 220 may be arranged in a pattern. A region 210 may be covered by devices 220 arranged in a grid pattern such as the grid pattern illustrated in FIG. 2a, or a radial pattern such as the radial pattern illustrated in FIG. 2b (the concentric circles in FIG. 2b are for reference only), or some other repeatable pattern. The pattern is not limited to a repeatable pattern. Irregular asymmetric or other non-repeatable "random" patterns may be used, for instance for installations which have high geometrical complexity or other surface constraints or where varying levels of coverage resolution are desired.

A region 210 may cover an entire structure or only a portion of a structure. For example, the grid pattern of FIG. 2a may be used to cover the tips of wings, while the radial pattern of FIG. 2b may be used to provide coverage for the tip of a radome (looking head-on towards the aircraft). More than one structure may be covered by the communication devices 220. Multiple regions of a structure may be covered by the communication devices 220. Structures that are susceptible to a lightning strike may be covered, and structures that are not susceptible to a lightning strike may also be covered.

"Density" of the devices 220 in a region 210 refers to the number of devices 220 distributed per unit area. The number of devices 220 per unit area might depend on factors such as cost and weight of adding the devices, criticality of structure, likelihood of lightning attaching or detaching (that is, susceptibility to a lightning strike), desired resolution, redundancy, etc.

The devices 220 may use components found in a radio frequency identification (RFID) device. A simple device 220 may only provide identification (e.g., ID number) or some other rudimentary information (e.g., location, model number, installation date, part number of monitored aircraft structural component, or security encryption or authentication key) when polled.

In some embodiments, all devices 220 in a region 210 may have the same threshold to a lightning strike. That is, all devices 220 will fail at a certain threshold.

In other embodiments, however, different devices 220 may have different thresholds. That is, some devices 220 may be able to withstand higher magnitude current. For example, a single device 220 having a high threshold is surrounded by devices 220 having a low threshold. If the surrounding devices are destroyed by lightning current, but the device having the high threshold is still operable, then the lightning strike can be assumed to have had a magnitude between the high and low thresholds. By interspersing such devices 220 with different thresholds, directionality or gradients of the current magnitude may be determined.

Thresholds of the devices 220 may be varied in a number of ways. As a first example, a range of conductive coatings can be applied to the surfaces to which the devices 220 are mounted. As a second example, different devices 220 may have different transient suppressor diodes for protection against high voltage.

The devices 220 can be wired together. For example, the devices 220 can be connected to a wired bus that runs near a surface of the aircraft. The devices 220 can be polled by an onboard computer that is connected to the wired bus. For example, a non-safety critical maintenance computer or other such dedicated computer may poll the devices 220, and then interface with a flight computer or other onboard computer. The wired bus may also be used to provide electrical power to the devices 220, such as may be needed for local device data storage, processing, and/or data input and output.

Wired buses have inherent problems. For instance, lightning current could flow through a wired bus instead of an LSP conductor. In that event, the wired bus could inadvertently facilitate the transport of the lightning-induced current to other portions of the aircraft. In addition, a string of devices 220 could be destroyed by the lightning current. These destroyed devices 220 would have to be replaced.

Wired buses have other inherent problems. The wired bus could create electromagnetic interference (EMI) issues with other onboard systems. The wired bus could be destroyed by lightning current, whereby the devices 220 could not be polled. Wireless devices avoid these inherent problems.

Reference is made to FIG. 7, which illustrates an example of a wireless communication device 710. The wireless device 710 includes a processor 720, antenna 730, memory 740 and transmitter/receiver 750. The memory 740 can be programmed with unique identification information. The device 710 transmits unique identification information when polled by a polling device (e.g., an RFID reader). The polling device performs the polling by sending radio waves containing commands.

The wireless device 710 may be a small, lightweight and inexpensive RFID tag. Conventional RFID tags are expected to fail when they are proximate to the current produced by a lightning strike (in a conventional RFID tag, the typical maximum voltage to any RFID pin is only 1.5 volts and maximum allowable current is only about 1.5 milliamps). Though RFID tags generally have built-in diodes for protection against body capacitance (static electricity), nearby passage of lightning current will likely cause the tag to fail.

Wireless devices 710 such as RFID devices or other passive devices can be powered by energy harvesting (e.g., electromagnetic, vibration, thermal) techniques. A passive RFID tag uses energy from the radio waves to electrically power up and transmit a response (e.g., supply the unique identification information) to the polling device's commands.

Wireless devices such as RFID tags are not limited to any specific operating frequency. Low frequency RFID tags typically operate in the 120-134 kHz range. High frequency RFID tags typically operate at 13.56 MHz. The wireless devices may even operate at ultra high frequencies, typically in the range of 850-960 MHz.

Wireless devices offer other advantages. They are small and lightweight. They are non-contact, and don't need a line of sight. And, because wires are not needed, the wireless devices can be added without adding measurable weight to an aircraft (which increases fuel costs and emissions). Moreover, the wireless devices are electrically isolated, and they can be added to locations where wires might not be able to run. Wireless devices can communicate directly with a flight computer instead of an intermediary (e.g., a non-safety critical computer).

The wireless devices 710 may be passive. An advantage of passive devices is that they don't need battery power. However, in some embodiments, the wireless devices 710 may be battery-powered.

Wireless communication devices could be polled in flight by an onboard computer. Wireless communication device can also be polled on the ground by a handheld device or other fixed or portable ground device.

A communication device may be mounted to a composite structure in a variety of ways. Different examples of mounting a communication device are illustrated in FIGS. 3-5.

Figure 3:
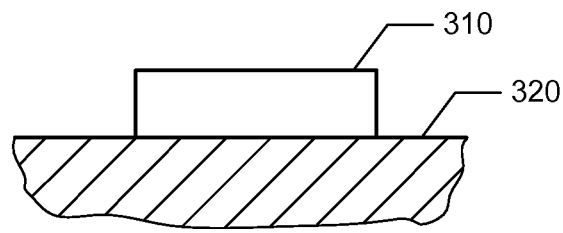
FIG. 3 is an illustration of a communication device that is surface mounted to an aircraft structure.

Reference is made to FIG. 3, which illustrates a wireless communication device 310 that is surface mounted to a structure (e.g., skin, structural spar, stringer) 320. In some embodiments, a wireless device 310 may be attached to a structure 320 by a sealant, epoxy, or a pressure sensitive adhesive that is temperature-cured or light-cured. In some embodiments a wireless device 310 manufactured to a rigid substrate may be attached to a structural element 320 with fasteners. Such a fastener may be made of a non-conductive material (e.g. nylon), or it may be made of a conductive material (e.g., metal) but have a good conductive path away from it. In some embodiments, a wireless device 310 manufactured to a rigid or flexible substrate may be attached to a structure 320 with adhesive tape.

Environmental conditions for surface mounted devices may be considered for each desired installation location. Top coating (e.g. paint or other protective covering) may be considered.

Figure 4:
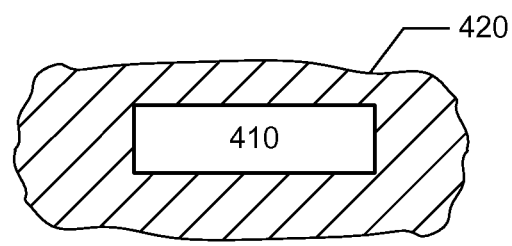
FIG. 4 is an illustration of a communication device that is embedded in an aircraft structure.
Figure 5:
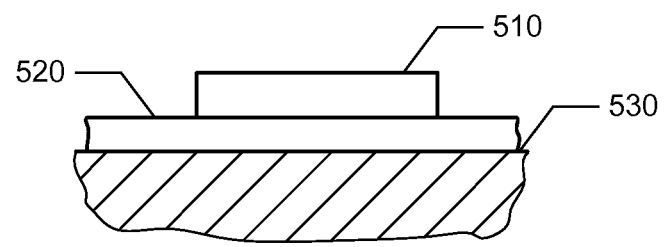
FIG. 5 is an illustration of a communication device carried by aircraft appliqué.

Reference is made to FIG. 4, which illustrates a wireless device such as an RFID tag 410 that is embedded in a composite structure such as a composite skin 420. An RFID tag 410 having the geometry of a label, for instance, could be placed between layers (within the first few plies) of fiberglass, prior to curing the fiberglass. Such an RFID tag 410 can withstand a standard cure cycle. Tests have verified read/write capability of an RFID tag 410 following 220° F. autoclave fiberglass panel curing temperatures. Tests have also verified that such an embedded RFID tag 410 would pass non-destructive inspection (NDI) testing (e.g., the tag 410 won't appear as a disbond or delamination).

Reference is made to FIG. 5, which illustrates a communication device 510 that is carried by appliqué 520. Appliqué, which typically has a thickness between 2-4 mils, provides a protective coating for composite structures such as fuselage skin, and wing skin (in lieu of paints and other coatings). The wireless device 510 may be surface mounted to the appliqué 520. The appliqué is then attached to a surface of a composite structure 530 using, for example, epoxy, sealant, pressure sensitive adhesive, temperature-cured adhesive, or light-cured adhesive.

The mounting approaches of FIGS. 3-5 may be applied to a composite structure. The mounting approaches of FIGS. 3 and 5 may be applied to a metal structure.

Communication devices could be installed by suppliers prior to shipping to an airframe integrator. Communication devices could be installed by an airframe integrator. Communication devices could be installed by private airlines, commercial airlines, military aircraft operators, individual aircraft operators, and maintenance providers.

Lightning strike detection described herein can be automated, and it can be performed quickly and inexpensively. A quick diagnosis can be made without any advance knowledge of the location of a lightning strike.

Moreover, the lightning strike detection can be performed in-flight or on the ground. One advantage of in-flight detection is that an aircraft capable of performing in-flight NDI can assess the structural health immediately after a lightning strike.

Reference is now made to FIG. 6, which illustrates a method for assessing the structural health of an aircraft. At block 610, polling is performed on a plurality of devices that cover a region of the aircraft. The polling can be performed periodically or in response to an event (e.g., a lightning strike), or both. All operative devices will respond to the polling by, for example, providing identification information.

At block 620, inoperative devices are identified. That is, those devices not responding to the polling are identified.

At block 630, locations of any inoperative devices are identified. The locations may be identified by accessing a lookup table of that returns a specific aircraft installation location in response to a unique device.

At block 640, analysis of an affected region is performed to identify inspection zones. Inspection zones will be examined in greater detail by NDI. At a minimum, the analysis may indicate whether the region under test was struck by lightning. If multiple devices are inoperative, the analysis may also suggest a path followed by the current, where the lightning detached, magnitude of the lightning strike, etc. In some embodiments, the analysis may indicate whether LSP failed.

More sophisticated analysis may link the IDs of failed devices with a record of actual installed location, and display a geometric representation of the aircraft, device installation, and damage path based on lack of device response. The analysis may include all information stored on the failed device (e.g. installation date, device model number, etc.) as well as act as the programming interface to write a unique ID to a given newly installed tag. The analysis may also be linked in to a historical trending database, or other, for comparison of damage across multiple aircraft.

At block 650, nondestructive inspection for damage caused by the lightning strike is performed on any inspection zones. For example, ultrasonic testing or infrared spectroscopy may be performed on an inspection zone.

Thus, the method of FIG. 6 allows NDI to be localized quickly, without any advance knowledge of the lightning strike. Very large areas of an aircraft structure do not have to be inspected, and specific indicators (e.g., areas containing surface pitting and paint damage) are far less likely to be missed.

The functions at block 610-640 may be performed in-flight. If the aircraft can perform in-flight NDI, the function at block 650 may also be performed in-flight. Lightning strike detection results may be sent to a computer that is on-board the aircraft, and/or it may be transmitted to a computer that is on the ground. If a lightning strike is detected, an appropriate action is taken. As a first example, a pilot is notified that the aircraft has been struck by lightning and the region that has been struck. If the aircraft can perform in-flight NDI, it could inspect any inspection zones and inform the pilot of any damage. A recommendation can then be made as to aborting or continuing the flight.

As a second example, if the lightning strike detection indicates that a region was struck by lightning, NDI could be performed by a ground crew after the aircraft has landed, or it could be performed later by a vehicle health maintenance service (VHMS). Once the aircraft is on the ground, additional NDI could be performed using conventional techniques.

The in-flight testing increases aircraft safety. Lightning strike detection described herein can also reduce an airline's maintenance costs and eliminate the need to abort flights for non-critical problems.

At block 660, once the aircraft is on the ground, structural damage can be fully assessed, and damaged structures can be repaired. In addition, inoperative devices can be replaced by maintenance personnel. If an inoperative device was surface mounted, it can be removed, and a replacement device can be surface mounted to the same location. If an inoperative device is embedded, a replacement device can be surface mounted to the location over the inoperative device.

Lightning strike detection described herein is not limited to composite aircraft. The lightning strike detection can also be applied to metal structures. The detection could also identify problems caused by lightning strikes on metal aircraft. For example, lightning-related problems could be identified in aircraft avionics systems.

Lightning strike detection described herein is not limited to aircraft. The lightning strike detection could be applied to other systems including, but not limited to, spacecraft and wind turbines.

Another application is for monitoring critical junctions in electrical power feeders for power networks. As high currents from lightning-induced overvoltages would travel along the power lines to any equipment powered by the lines, possible paths of transient surges due to direct effects of lightning strikes can be isolated to a subset of the number of branches in a multi-branch power distribution network. By using RFID tags positioned at intervals along the power lines (e.g., encased within an environmental protection enclosure and attached to the critical wire or junction) with varying detection thresholds, surge magnitudes could be determined. Electrical power utility company personnel could use RFID tag readers and simply drive by power lines equipped with such RFID tags to determine the path and/or extent of transient surge.

Detection described herein is not limited to lightning strike detection. Lighting is an electromagnetic effect (EME). More generally, the detection described herein can be applied to the detection of EME. A plurality of wireless communication devices arranged on a region of a body can be used to detect effects of EME on that region.

The invention claimed is:

1. An aircraft comprising:
    a composite aircraft structure;
    a plurality of small lightweight pollable communication devices arranged in a pattern about a region of the structure and having a density for localizing damage caused by a lightning strike to the region, each device rendered inoperative if at least proximate to lightning current.

2. The aircraft of claim 1, wherein the structure is susceptible to a lightning strike.

3. The aircraft of claim 2, wherein the structure is of one of a nacelle, a wing tip, a horizontal stabilizer tip, and a vertical stabilizer tip.

4. The aircraft of claim 1, wherein the devices are arranged in a repeating pattern that allows damage by lightning current to be localized.

5. The aircraft of claim 1, wherein operable devices only provide identification information when polled.

6. The aircraft of claim 1, wherein at least some of the devices have different current and voltage thresholds so directionality or gradients of strike magnitude can be determined.

7. The aircraft of claim 1, wherein the devices are wireless devices.

8. The aircraft of claim 1, wherein the devices are RFID tags.

9. The aircraft of claim 1, wherein at least some of the devices are surface mounted to the composite structure.

10. The aircraft of claim 1, wherein at least some of the devices are embedded in the composite structure.

11. The aircraft of claim 1, wherein at least some of the devices are carried by appliqué on the composite structure.

12. A structure that will be susceptible to electromagnetic effects, the structure comprising:
    a composite body; and
    a plurality of RFID tags mounted to a region of the body in a pattern and density for localizing damage caused by EME current, each tag rendered inoperative if at least proximate to EME current.

13. The structure of claim 12, wherein the structure is aircraft skin.

14. The structure of claim 12, wherein the structure is of one of a nacelle, a wing tip, a horizontal stabilizer tip, and a vertical stabilizer tip of an aircraft.

15. The structure of claim 12, wherein the pattern is a repeating pattern of the devices.

* * * * *